May 16, 1950 P. E. HOFFMEISTER 2,508,027
CELESTIAL POSITION INDICATOR AND COMPASS
Filed Jan. 31, 1948 4 Sheets-Sheet 1

INVENTOR:
*Philip E. Hoffmeister*,
BY Paul & Paul
ATTORNEYS.

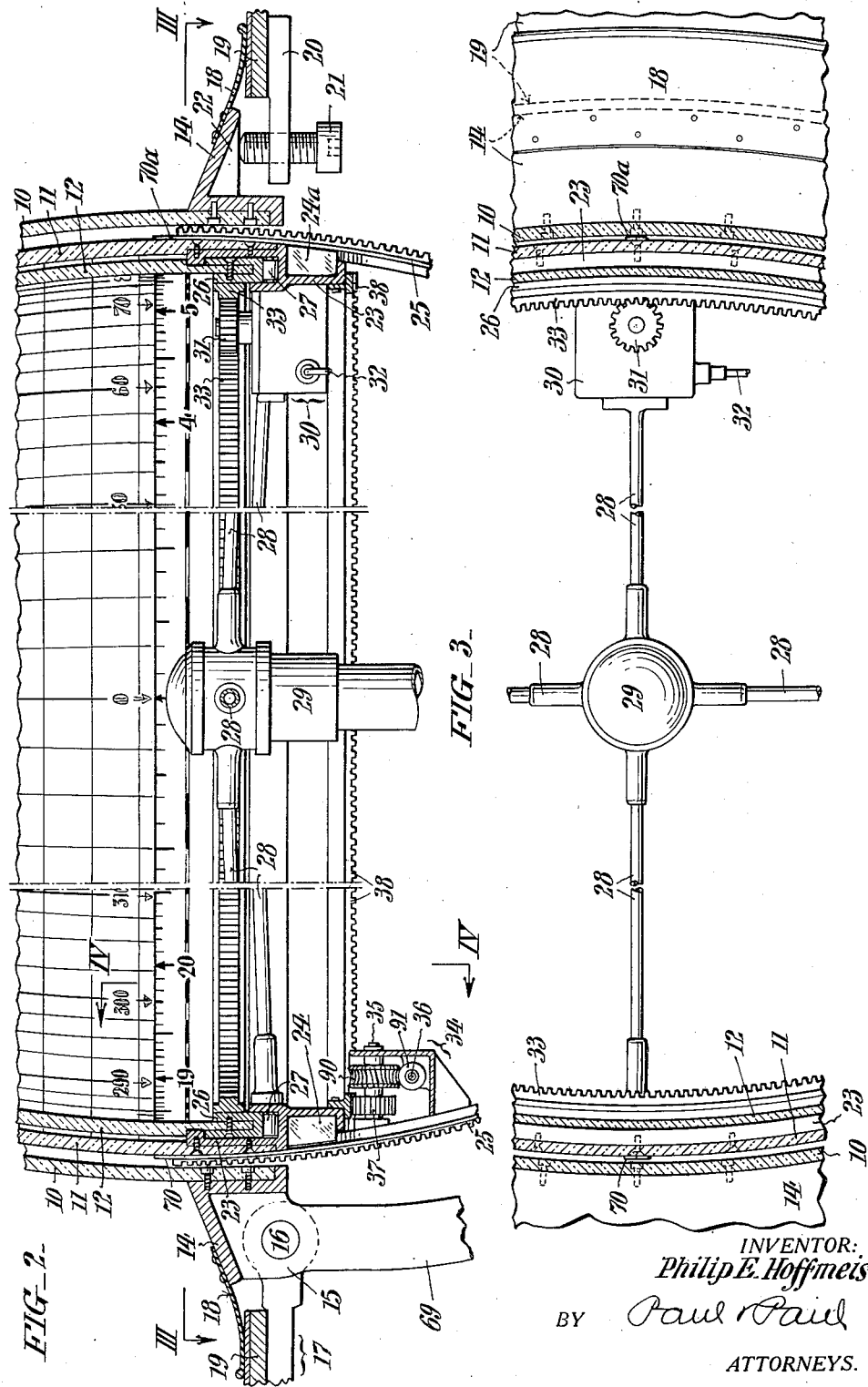

May 16, 1950   P. E. HOFFMEISTER   2,508,027
CELESTIAL POSITION INDICATOR AND COMPASS
Filed Jan. 31, 1948   4 Sheets—Sheet 3
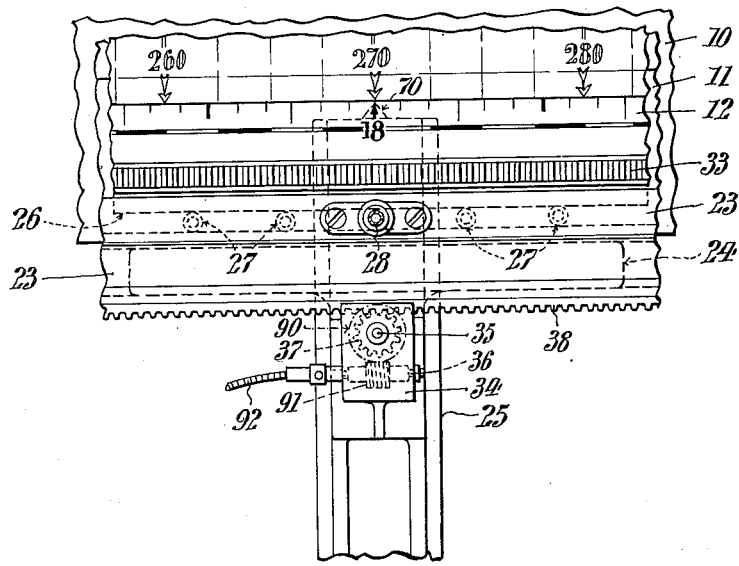
FIG_4_
INVENTOR:
Philip E. Hoffmeister,
BY Paul & Paul
ATTORNEYS.

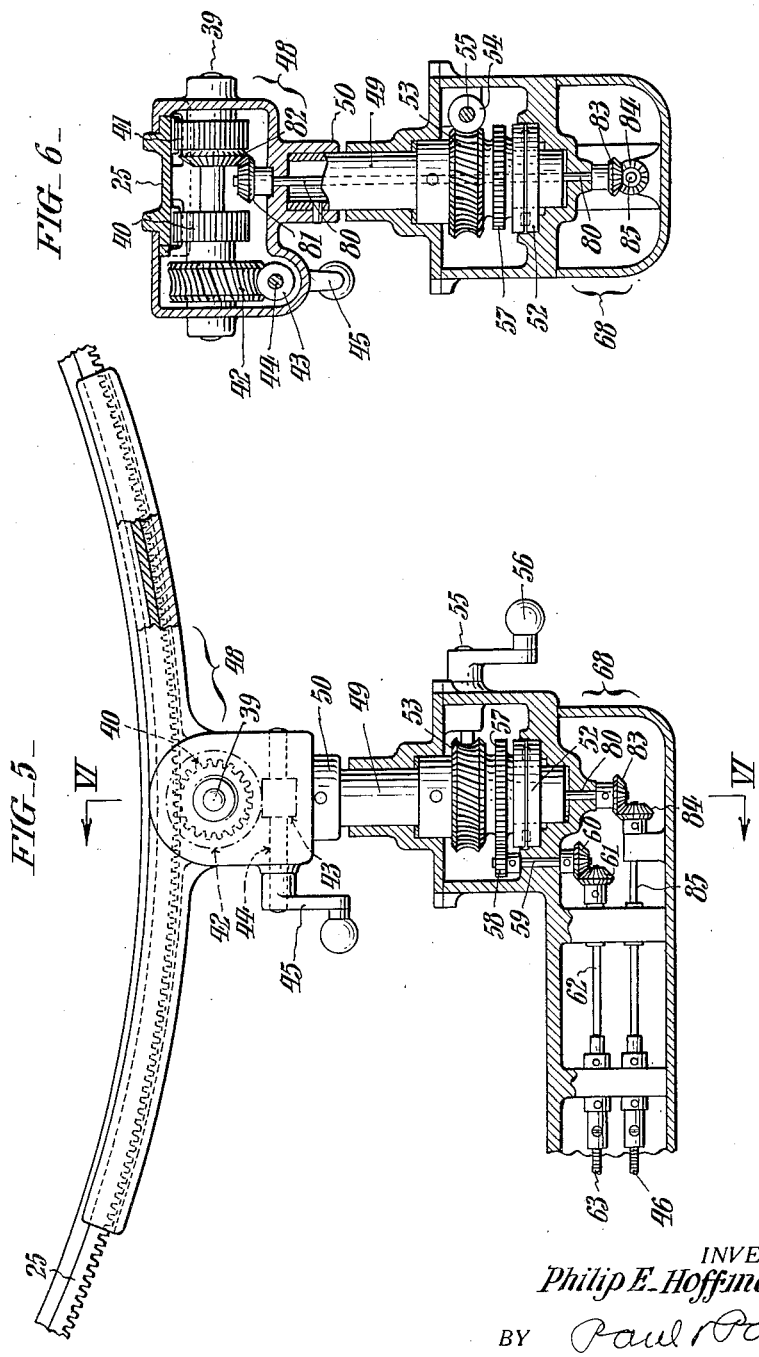

Patented May 16, 1950

2,508,027

UNITED STATES PATENT OFFICE 2,508,027

CELESTIAL POSITION INDICATOR AND COMPASS

Philip E. Hoffmeister, Perkasie, Pa.

Application January 31, 1948, Serial No. 5,668

3 Claims. (Cl. 33—1)

This invention relates to a navigational device for providing an indication of position and to a method of navigation for determining position and true heading without resort to mathematical calculations.

It is well known in the art of navigation that the position of an observer at a given time may be determined by measuring the position of one or more celestial bodies and solving a number of mathematical equations using the values so obtained. This method is not only laborious and time-consuming, but in the case of fast moving aircraft the final determination of position represents a geographical point significantly at variance with the actual position as of the time of determination since the aircraft moves over a considerable distance during the time required for making the necessary mathematical calculations. It is therefore necessary to supplement the calculated values for position with estimated or dead reckoning values for the change in position in order to arrive at the instantaneous position. This is obviously a disadvantage, particularly in the case of high speed travel by air. For sonic and supersonic speeds it becomes unworkable due to the large degree of error introduced in estimating change of position.

One object of the present invention is to provide means for quickly determining the instantaneous geographical position of a moving object without resort to the solving of mathematical problems.

A further object of the present invention is to provide means for instant and continuous visual indication of position and true heading of objects in motion relative to the earth's surface.

A still further object is to provide a novel and simplified method of navigation for ships, aircraft, guided missiles and the like whereby such carriers may be continuously directed along a desired path to a selected destination.

Further objects and particular features of the present invention will appear from the following description having reference to the annexed drawings, it being intended that the specific embodiments therein shown shall be taken as being merely illustrative and not restrictive. In the drawings:

Fig. 2 is an enlarged fragmentary section of the central part of the structure shown in Fig. 1.

Fig. 3 is a plan view of the mechanism of Fig. 2 taken as indicated by the arrows III—III in Fig. 2.

Fig. 4 is a fractural elevation taken as indicated by the lines IV—IV on Fig. 2.

Fig. 5 is a vertical section of the rotating mechanism shown at the base of Fig. 1.

Fig. 6 is a vertical section taken as indicated by the arrows VI—VI on Fig. 5.

Figure 1:
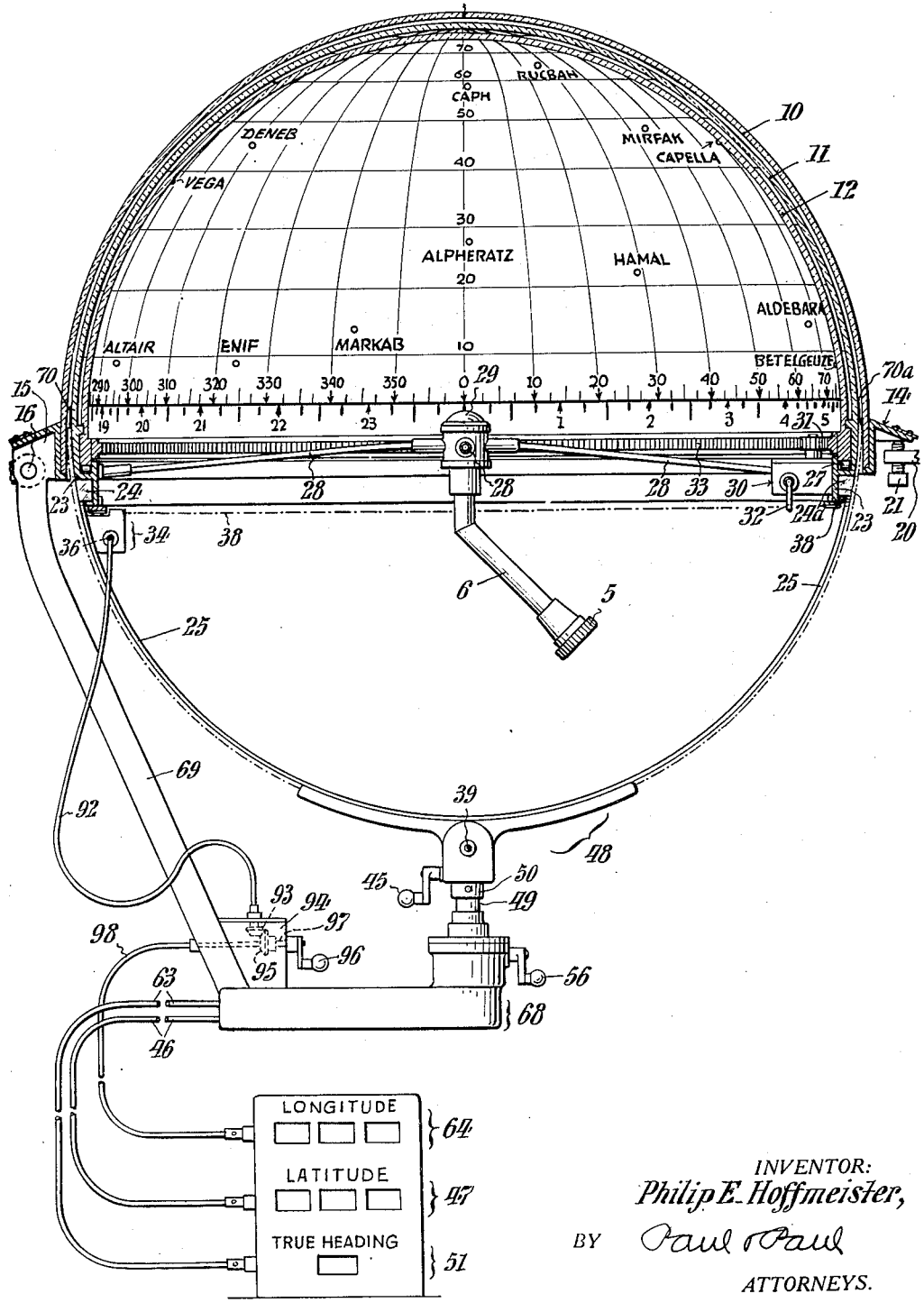
Fig. 1 is a side elevation of the position indicator and compass and associated mechanism of the present invention, the upper part being in vertical section in order to show important constructional details.

In the drawings, spherical elements 10, 11 and 12 have a common center and are concentrically mounted. Hemisphere 10 is fixedly mounted and is maintained in fixed position as hereinafter described. Earth hemisphere 11 and star hemisphere 12 are rotationally movable relative to each other about their common polar axis. They are also rotationally movable in coupled relation about their common polar axis, about a fixed vertical axis and about a fixed horizontal axis. Hemisphere 10 is provided with a visual marking 13 at its topmost point located at the intersection of said fixed vertical axis and the upper circumference of hemisphere 10. Each of the hemispheres 10, 11 and 12 are constructed of a transparent material such as "Plexiglas." Earth hemisphere 11 is marked as shown with lines of latitude and longitude, thus providing means for designating the geographical location of all points lying on its circumference. It is provided with designations of longitude around its equatorial circumference and with designations of latitude along the meridian as shown. Star hemisphere 12 is provided with small openings corresponding in position to the relative positions of a plurality of stars. Around its equatorial circumference it is provided with markings corresponding to time divisions of the sidereal day comprising 23 hours, 56 minutes and 4.099 seconds.

Hemisphere 10 is firmly attached to mounting ring 14 as shown in Fig. 2. Attached to ring 14 is mounting bracket 15 which is pivotally mounted on the pin 16 carried by supporting arm 17. Mounting ring 14 is provided with a flexible apron 18 which is attached to the vehicle structure 19 as shown. A second arm 20 is likewise fixed to element 19 and is provided with an adjusting screw 21 which makes contact with the bracket 22 and thereby provides an adjusting means for a preliminary leveling of mounting ring 14 and all of the structure attached thereto. Earth hemisphere 11 is attached to the double channeled supporting ring 23 which is slidably supported on segmented shoes 24 and 24a carried by arcuate gear rack 25. Pointers 70 and 70a are attached to shoes 24 and 24a respectively and extend upwardly to give a positional indication behind the numbers marked on the longitude scale of earth hemisphere 11.

Star hemisphere 12 is mounted within U-shaped ring 26 which is slidably mounted within the upper channel of ring 23 and is carried by the rollers 27. Rollers 27 are mounted within the upper channel of ring 23 as shown in Fig. 2. Spokes 28 are attached to ring 23 and viewing element 29 is fixedly mounted at the center of said spokes. Electric timer element 30 which drives gear 31 is a type well known in the art and is mounted on the channel ring 23. It is provided with an electrical connection 32 for energization and may be operated both to adjust the position of star hemisphere 12 and also to maintain continuously the relative positions of earth hemisphere 11 and star hemisphere 12 in timed relation. Gear ring 33 is attached to ring 26 and engages with gear 31, thus making it possible to rotate star hemisphere 12 relative to earth hemisphere 11 independently of the other motions hereinafter described.

Bracket 34 is mounted on arcuate gear rack 25 and provides a support for shaft 35 and shaft 36. Gear wheel 37 is mounted on shaft 35 and engages with gear track 38 which in turn is fixedly attached to ring 23. Also attached to shaft 35 is worm wheel 90 which is driven by the worm 91 carried on shaft 36. Flexible drive shaft 92, shown in Fig. 1, is attached to shaft 36 and carries a driven bevel gear 93 at its lower end. Drive shaft 92 terminates at case 94 and bevel gear 95 engages bevel gear 93. Adjusting handle 96 is attached to shaft 97 and thus provides means for operating gear 93, worm gear 91, worm wheel 90 and gear 38. This results in a simultaneous rotation of hemispheres 11 and 12 about their common polar axis. Flexible cable 98 is attached to shaft 97 at one end and at the other end is attached to longitude indicator 64.

Arcuate gear rack 25 is slidably mounted in rotatable yoke 48 which is mounted on vertical shaft 49 by means of a collar 50 which is attached to yoke 48, as shown in Figs. 5 and 6. Shaft 49 is mounted in thrust bearing 52 and is rotated by worm wheel 53 which is actuated by worm gear 54. Shaft 55 carries worm 54 and is actuated by the rotation of the arm 56. Shaft 49 is also provided with a gear 57 which engages gear 58 carrying shaft 59 at the lower end of which is mounted bevel gear 60. Bevel gear 61 engages bevel gear 60 and is attached to indicator shaft 62 to which is attached flexible cable 63 which transmits the motion of shaft 62 to true heading indicator 51.

Gears 40 and 41 are mounted on shaft 39 and engage gear rack 25 as shown in Figs. 5 and 6. Worm wheel 42 is also mounted on shaft 39 and is engaged by worm gear 43 which is mounted on shaft 44. Handle 45 is provided for rotating shaft 44 thus providing means for sliding track 25 in yoke 48 and thereby imparting a rotational movement about a fixed horizontal axis. The extent of such movement is indicated by means of a take-off shaft 80 having a bevel gear 81 which engages with gear 82 carried by shaft 39. At its lower end shaft 80 carries a bevel gear 83 which engages with bevel gear 84 and thus drives indicating shaft 85. Flexible shaft 46 is attached to shaft 85 and leads to latitude indicator 47.

The mechanism for rotating shaft 49 and for sliding track 25 in yoke 48 is mounted as a part of housing element 68 which is carried by supporting arm 69. The platform represented by housing element 68 may be automatically stabilized in a horizontal position by gyroscope or similar well known means not shown.

In order to obtain positional readings of the highest accuracy in the use of the present invention, it is necessary to operate under conditions in which the vertical axis referred to above is maintained in a fixed perpendicular position. This is accomplished by taking the reading during the time in which the aircraft or other vehicle is in a position in which the ring structure 14 is level. In the case of aircraft this can be accomplished by taking the observation during the time when the airplane is flying straight and level. However, since the position of the nose of the plane relative to the horizon varies with different load conditions, means have been provided for making adjustments in order to level ring structure 14. This leveling is accomplished by raising or lowering the forward portion of ring 14 relative to plane structure 19 by adjustments of the screw 21. This results in a rotation of bracket 15 and associated arm 69 around the pivot element 16. Exact adjustment is facilitated by the use of a level (not shown) mounted on platform 68. Alternatively gyroscopic means may be used for stabilizing the position of platform 68 horizontally as referred to above.

The present invention includes the method of determining position by adjusting the position of a spherical star element so that star markings thereon correspond in position to the position of the stars in the heavens, simultaneously positioning a concentrically mounted spherical earth element maintained in proper timed relationship to the star element and then directly determining position by reference to the point corresponding to the geographical location of the observer. This point is the point at which the fixed vertical axis of the spherical element 10 intersects the circumference of the earth element and may be directly observed or indirectly observed by reference to the indicating means shown.

It will be noted that the apparatus shown in the drawings comprises mechanical means for accomplishing this purpose by providing two axes of rotation maintained at right angles to each other for coupled movement of the star and earth hemispheres, one axis for coupled movement about the common polar axis of the star and earth hemispheres, and a fourth axis for relative rotation of the two hemispheres about their common polar axis.

In order to carry out the navigational method of the present invention using the apparatus shown and described in the present specification, the operator first adjusts the position of star hemisphere 12 relative to the earth hemisphere 11 to correspond with the sidereal time. Timer 30 is then put in operation and the proper relationship is automatically maintained. Once the preliminary adjustment is made the electric timer is permitted to operate continuously and thus maintains the proper time relationship between the star and earth hemispheres. Determination of position is carried out by positioning star hemisphere 12 so that the holes in its circumference correspond in position to that of the corresponding stars in the heavens as viewed through eye piece 5 which is attached by means of movable shaft 6 to viewing element 29 mounted at the center of the hemispheres. This is accomplished by making the proper adjustments in the position of star hemisphere 12 through operation of the handles 45, 56 and 96. At the point of exact correspondence of star hole and star a characteristic concentration of light or "light bloom" is visually apparent to the operator who then makes the necessary adjustments to bring one or more additional star holes into exact correspondence with the stars being observed. As soon as this has been accomplished the position of the observer is immediately available either by reading on the earth chart the latitude and longitude corresponding to the position of mark 13 or by reading the corresponding mechanically derived values for the latitude and longitude of this position from the indicators 47 and 64. The true heading will be indicated at indicator 51.

While the embodiment of the present invention as illustrated in the drawings includes mechanism for manual positioning of the star hemisphere to correspond with the position of the stars in the heavens, it will be apparent to those familiar with the art of matching and following that the manual crank elements may be operated by suitable electric motors or the like. Moreover, the openings shown in the star hemisphere may be replaced by suitable lenses or other optical light gathering devices. The star hemisphere may also be automatically maintained in the desired correspondence with the stars through the action of suitable following devices well known in the art. It will also be apparent that the indicating means showing position and true heading may be remotely mounted with respect to the star hemisphere and the rotating mechanism. This makes it possible to use such remotely mounted indicating means as a continuous reference provided the matching and following mechanism is continuously operated. Where this procedure is followed the indicating means becomes a combination compass and position indicator.

Having thus described my invention, I claim:

1. In a position indicating instrument, a transparent star spherical element and a transparent earth spherical element movably positioned one within the other and having a common center, said star element having designations corresponding to a plurality of navigational stars and said earth element having visible designations of geographical locations; supporting means for said elements; means indicating the positional relationship between said spherical elements with respect to time; polar axis rotational means operatively connected to one of said spherical elements whereby said time positional relationship may be varied; means for maintaining said elements in a predetermined positional relationship; vertical axis rotational means operative to rotate both of said elements simultaneously about a fixed vertical axis while maintaining said positional relationship; horizontal axis rotational means operative to rotate both of said elements simultaneously about a fixed horizontal axis perpendicular to said vertical axis while maintaining said positional relationship; polar axis rotational means operative to rotate both of said elements simultaneously about their common polar axis while maintaining said positional relationship; a viewing element positioned within said spherical elements at the center thereof; and position indicating means identifying the point of intersection of said vertical axis and the circumference of said earth element.

2. In a position indicating instrument, a transparent star spherical element and a transparent earth spherical element movably positioned one within the other and having a common center, said star element having designations corresponding to a plurality of navigational stars and said earth element having visible designations of geographical locations; supporting means for said elements comprising a movable ring engaging said earth spherical element and a second ring engaging said star spherical element and movably mounted within said first ring; means indicating the positional relationship between said spherical elements with respect to time; polar axis rotational means operatively connected to one of said spherical elements whereby said time positional relationship may be varied; means for maintaining said elements in a predetermined positional relationhip; vertical axis rotational means operative to rotate both of said elements simultaneously about a fixed vertical axis while maintaining said positional relationship; horizontal axis rotational means operative to rotate both of said elements simultaneously about a fixed horizontal axis perpendicular to said vertical axis while maintaining said positional relationship; polar axis rotational means operative to rotate both of said elements simultaneously about their common polar axis while maintaining said positional relationship; a viewing element positioned within said spherical elements at the center thereof; and position indicating means identifying the point of intersection of said vertical axis and the circumference of said earth element.

3. In a position indicating instrument, a transparent star spherical element and a transparent earth spherical element movably positioned one within the other and having a common center, said star element having designations corresponding to a plurality of navigational stars and said earth element having visible designations of geographical locations; supporting means for said elements comprising a movable ring engaging said earth spherical element and a second ring engaging said star spherical element and movably mounted within said first ring; means indicating the positional relationship between said spherical elements with respect to time; polar axis rotational means operatively connected to said second ring whereby said time positional relationship may be varied; means for maintaining said elements in a predetermined positional relationship; vertical axis rotational means comprising a rack and a supporting, rotatably mounted yoke, said yoke being in operative engagement with said first ring, said rotational means being operative to rotate both of said spherical elements simultaneously about a fixed vertical axis while maintaining said positional relationship; horizontal axis rotational means including said yoke and said rack operative to rotate both of said elements simultaneously about a fixed horizontal axis perpendicular to said vertical axis while maintaining said positional relationship; polar axis rotational means operative to rotate both of said elements simultaneously about their common polar axis while maintaining said positional relationship; a viewing element positioned within said spherical elements at the center thereof; and position indicating means identifying the point of intersection of said vertical axis and the circumference of said earth element.

PHILIP E. HOFFMEISTER.

REFERENCES CITED

The following references are of record in the file of this patent:

UNITED STATES PATENTS

| Number | Name | Date |
| --- | --- | --- |
| 1,223,502 | Mace | Apr. 24, 1917 |
| 2,337,587 | Brockey | Dec. 28, 1943 |
| 2,429,754 | Hagner | Oct. 28, 1947 |

FOREIGN PATENTS

| Number | Country | Date |
| --- | --- | --- |
| 147,690 | Great Britain | Sept. 15, 1921 |
| 218,527 | Great Britain | July 10, 1924 |